United States Patent
Nambiar (10) Patent No.: US 8,161,543 B2
(45) Date of Patent: Apr. 17, 2012

(54) VLAN TUNNELING

(75) Inventor: Brijesh Nambiar, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 1354 days.

(21) Appl. No.: 11/644,098

(22) Filed: Dec. 22, 2006

(65) Prior Publication Data

US 2008/0155252 A1    Jun. 26, 2008

(51) Int. Cl.
*H04L 29/06* (2006.01)

(52) U.S. Cl. .......... 726/15; 713/153; 713/162; 713/163; 380/29; 380/247; 380/277; 370/230; 370/338; 370/401

(58) Field of Classification Search .................. 370/338, 370/401, 230; 713/153, 163, 201, 162; 380/29, 380/247, 277; 726/15
See application file for complete search history.

(56) References Cited

U.S. PATENT DOCUMENTS

| | | | | |
|---|---|---|---|---|
| 7,194,622 B1* | 3/2007 | Halasz et al. | ................. | 713/163 |
| 7,505,434 B1* | 3/2009 | Backes | ......................... | 370/331 |
| 2005/0223111 A1* | 10/2005 | Bhandaru et al. | ............. | 709/236 |
| 2006/0072584 A1* | 4/2006 | Goto et al. | ................ | 370/395.53 |
| 2006/0206933 A1* | 9/2006 | Molen et al. | ..................... | 726/14 |
| 2007/0071010 A1* | 3/2007 | Iyer et al. | ................. | 370/395.53 |
| 2007/0121565 A1* | 5/2007 | Halasz et al. | ................. | 370/338 |

OTHER PUBLICATIONS

Cisco, "Wireless Virtual LAN Deployment Guide", http://www.cisco.com/warp/public/cc/pd/witc/ao1200ap/prodit/wvlan_an.pdf, pp. 1-35, 2003.*

* cited by examiner

*Primary Examiner* — Brandon Hoffman
*Assistant Examiner* — Hee Song
(74) *Attorney, Agent, or Firm* — Blakely, Sokoloff, Taylor & Zafman LLP (57) ABSTRACT

According to one embodiment of the invention, a method for establishing multiple tunnels for each virtual local area network is described. Upon receiving information over a first tunnel associated with a first virtual local area network, a determination is made whether the information is from a network device assigned to a second virtual local area network, which differs from the first virtual local area network. If the network device is a member of the second virtual local area network, a second tunnel associated with the second virtual local area network is created.

11 Claims, 6 Drawing Sheets

VLAN TUNNELING

FIELD

Embodiments of the invention relate to the field of communications, in particular, to a system and apparatus for establishing separate communication paths between network devices, each communication path representing a virtual local area network (VLAN).

GENERAL BACKGROUND

Over the last decade or so, companies have installed enterprise networks with one or more local area networks in order to allow their employees access to various network resources. To improve efficiency, enhancements have been added to local area networks such as wireless access. Based on this enhancement, wireless local area networks (WLANs) have been and continue to be utilized by more and more companies.

Typically, a WLAN supports communications between wireless stations (STAs) and Access Points (APs). In general, each AP operates as a relay station by supporting communications with other network devices, such as wireless stations and other APs being part of a wireless network, as well as with resources on a wired network.

In some implementations, a WLAN features a collection of virtual local area networks (VLANs), which are created in order to enable multicast and broadcast transmissions from an AP to be directed to smaller groups of wireless stations. In general, a "VLAN" is a logical subgroup within a local area network (e.g., WLAN) that is created via software rather than physical movement of networking cables. It combines network devices, such as a plurality of wireless stations (STAs) for example, into a single collective group regardless of its physical LAN segment.

While multiple VLANs can be supported within a WLAN, there are no mechanisms that provide sufficient security to broadcast and multicast transmissions since such transmissions are provided to all STAs associated with the AP. There is no communication scheme that segregates and restricts broadcast and multicast coverage to different VLANs supported by the same network device.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a system and apparatus for establishing communication paths between two network devices, such as an Access Point and a network switch for example. According to one embodiment of the invention, each communication path is created in accordance with a tunneling protocol and assigned to a particular virtual local area network (VLAN). These tunnels provide better security by utilizing a different encryption key for each tunnel and provide an ability to segregate users using a single Basic Service Set Identifier (BSSID).

Tunneling protocols generally involve the encapsulating of private network data and protocol information within public network transmission units so that the private network protocol information appears to a public network as data. Tunneling allows the use of a public network, such as the Internet for example, to convey data on behalf of a private network. Of course, in a broader sense, tunneling involves the encapsulation of data from one format to another, regardless whether the data is transmitted within the same network type (e.g., private or public) or between different network types (e.g., private to public, etc.).

Herein, according to one embodiment, the invention may be implemented within a variety of wireless networks. Examples of wireless networks include, but are not limited or restricted to wireless local area networks (WLANs) or wireless personal area networks (WPANs). The wireless network may be configured in accordance with any current or future wireless communication protocols. Examples of various types of wireless communication protocols include, but are not limited or restricted to the following: WiFi in accordance with Institute of Electrical and Electronics Engineers (IEEE) 802.11-based standards or High Performance Radio Local Area Network (HiperLAN) standards, WiMax (IEEE 802.16), or the like.

It is contemplated that the wireless communications may be in accordance with any of a number of different types of IEEE 802.11x standards, including but are not limited or restricted to the following: (i) an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); (ii) an IEEE 802.11a standard entitled "Wireless LAN Medium Access Control (MAC) and Physical Layer (PHY) specifications: High-Speed Physical Layer in the 5 GHz Band" (IEEE 802.11a, 1999); (iii) a revised IEEE 802.11 standard "Wireless LAN Medium Access Control (MAC) and Physical Layer (PHY) specifications" (IEEE 802.11, 2003); and (iv) a draft IEEE 802.11e standard entitled "Wireless Medium Access Control (MAC) and Physical Layer (PHY) specifications: Medium Access Control (MAC) Quality of Service (QoS) Enhancements" (IEEE 802.11e, 2004), or the like.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, "software" is generally considered to be executable code such as an application, an applet, a routine or even one or more executable instructions stored in a storage medium. The "storage medium" may include, but is not limited or restricted to a programmable electronic circuit, a semiconductor memory device inclusive of volatile memory (e.g., random access memory, etc.) and non-volatile memory (e.g., programmable and non-programmable read-only memory, flash memory, etc.), information-carrying medium, a hard drive, a portable memory device (e.g., floppy diskette, a compact disk "CD", digital versatile disc "DVD", a digital tape, a Universal Serial Bus "USB" flash drive), or the like.

A "network device" includes a station "STA" (e.g., any data processing equipment such as a computer, cellular phone, personal digital assistant, etc.), an Access Point "AP", data transfer device (e.g., a network switch), or the like.

An "interconnect" is generally defined as a communication pathway established over an information-carrying medium. The interconnect may be a wired interconnect, where the medium is a physical medium (e.g., electrical wire, optical fiber, cable, bus traces, etc.), a wireless interconnect (e.g., air in combination with wireless signaling technology) or a combination of these technologies.

"Information" is defined as data, address, control, or any combination thereof. Information may be transmitted from one network device to another in the form of a message, namely a collection of bits in a predetermined format. One type of message, namely a wireless message, includes a header and payload data having a predetermined number of bits of information. The wireless message may be placed in a format as one or more packets, frames or cells.

I. Network Architecture

Figure 1:
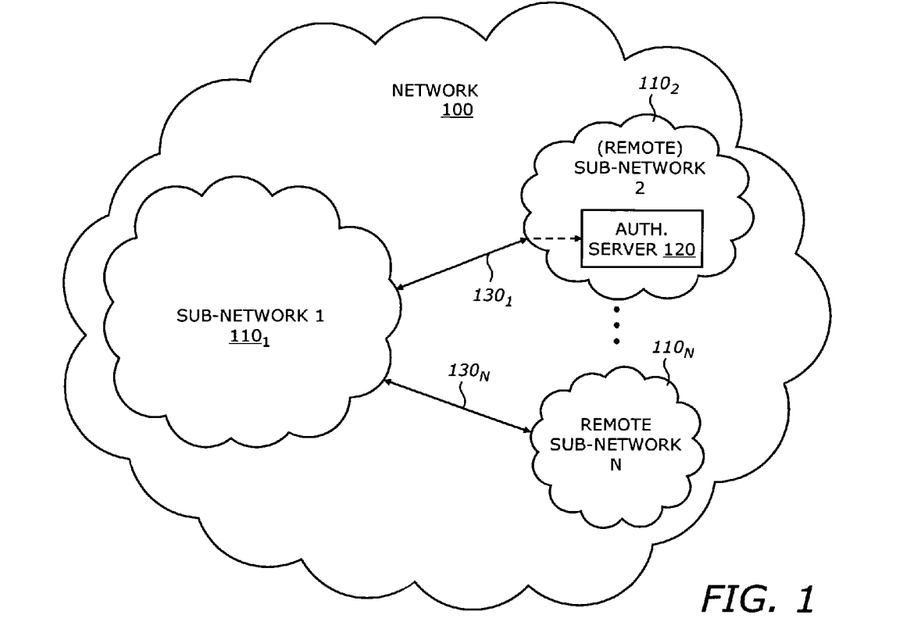
FIG. 1 is an exemplary embodiment of a network.

Referring to FIG. 1, an exemplary embodiment of a network 100 is shown. In accordance with one embodiment of the invention, network 100 operates as a private network such as a local area network with enhancements that allow wireless access, thereby operating as a wireless local area network (WLAN). According to this illustrative embodiment of the invention, network 100 comprises a collection of independent, logical sub-networks $110_1$-$110_N$ (where $N \geq 1$) that operate as virtual local area networks (VLANs). As shown, at least one of the VLANs (e.g., VLAN $110_1$) includes a remotely located resource 120 (e.g., authentication server) that is accessible over an interconnect $130_1$. VLANs $110_1$-$110_N$ may increase overall performance of network 100 by grouping users and resources that communicate most frequently with each other.

Figure 2:
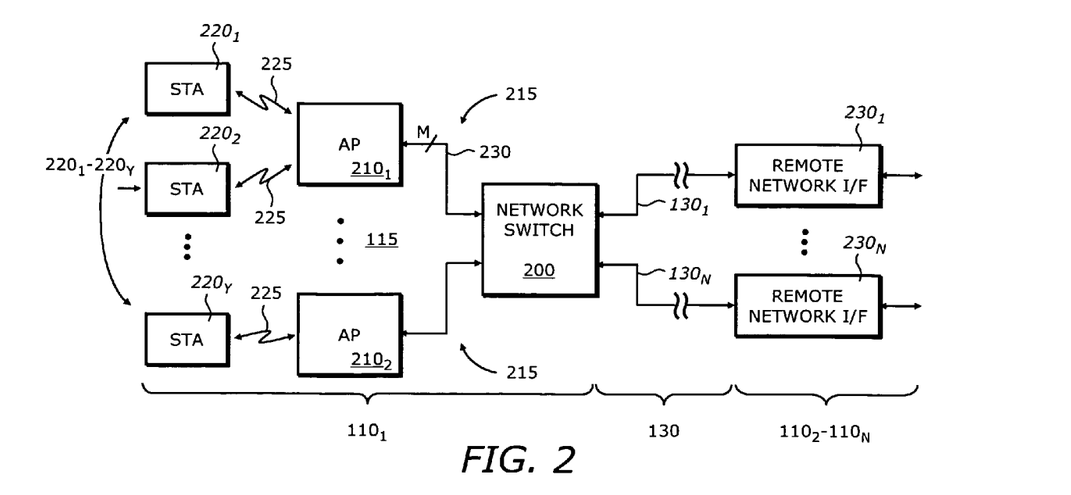
FIG. 2 is a detailed exemplary embodiment of the network of FIG. 1 including an access point (AP) and network switch operating in accordance with the invention.

Referring now to FIG. 2, a detailed exemplary embodiment of network 100 of FIG. 1 is illustrated. According to this embodiment of the invention, network 100 features a WLAN that comprises a network switch 200 (e.g., WLAN switch) in communication with one or more access points (APs) $210_1$-$210_X$ (where $X \geq 1$, $X=2$ for this embodiment) over an interconnect 215. One or more wireless stations, identified as STAs $220_1$-$220_Y$ (where $Y \geq 1$, $Y=3$ for this embodiment), are in communication with APs $210_1$-$210_2$ over wireless interconnects 225.

More specifically, for this embodiment of the invention, AP $210_1$ supports bi-directional communications by receiving and processing wireless messages from one or more STAs (e.g. STAs $220_1$ and $220_2$) that are within its coverage area and that are associated with AP $210_1$. Such processing may involve extracting information from the wireless messages, placing such information into another message, and transferring the message to network switch 200 over interconnect 215.

For instance, as shown as an illustrative embodiment of a network configuration, STA $220_1$ may be associated with AP $210_1$ and communicates over the air in accordance with a selected wireless communications protocol. Hence, AP $210_1$ generally operates as a transparent bridge interconnecting a wireless and wired network.

Moreover, AP $210_1$ operates with network switch 200 to create one or more Open Systems Interconnection Layer 3 (OSI-L3) tunnels 230 for each VLAN for whom STAs $220_1$-$220_Y$ are members. These OSI-L3 tunnels 230 are created in response to detecting particular attributes associated with (i) one or more STAs in communication with AP $210_1$, and/or (ii) communications initiated by a STA (e.g., STA $220_1$). The OSI-L3 tunnel encapsulates both OSI Layer 2 and Layer 3 (L2/L3) traffic between AP $210_1$ and network switch 200. Examples of protocols used in forming OSI-L3 tunnels 230 include, but are not limited or restricted to Generic Routing Encapsulation (GRE), Point-to-Point Tunneling Protocol (PPTP), IP Security (IPSec), and the like. The particular attributes may be detected by network switch 200 during association operations between the STA and AP $210_1$, during authentication operations, or after authentication operations by network switch 200.

Figure 3:
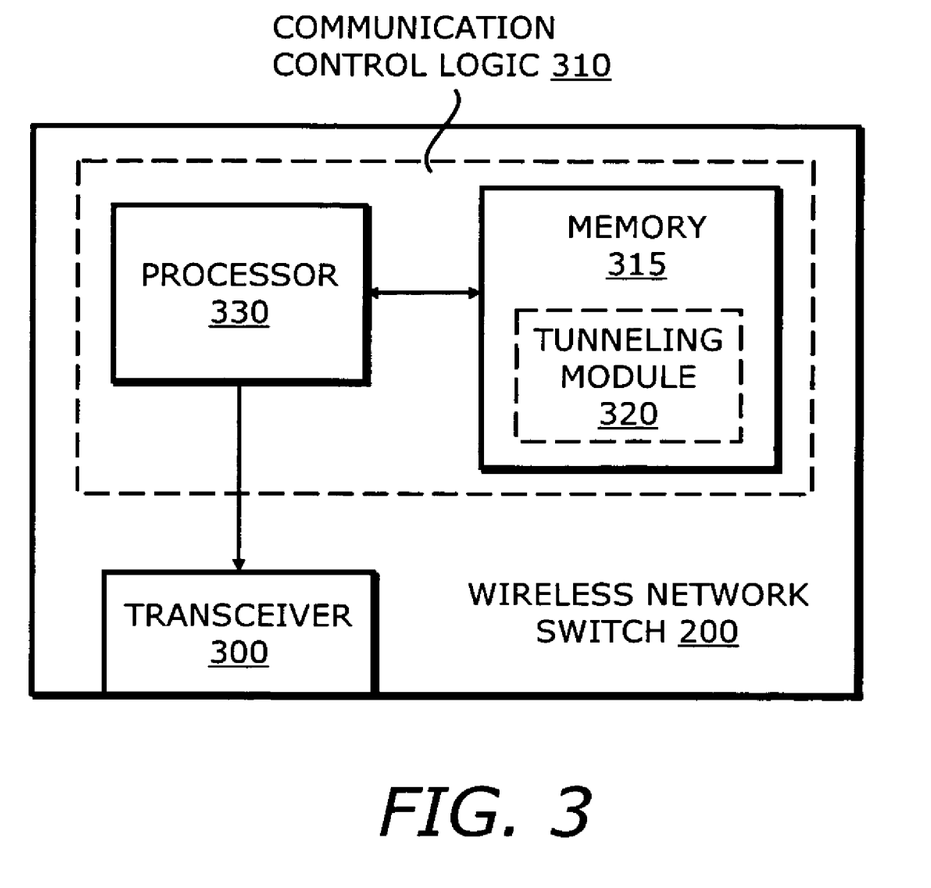
FIG. 3 is an exemplary embodiment of a network switch implemented within a wireless network and operating in accordance with the invention.

Referring now to FIG. 3, network switch 200 comprises a transceiver 300 and communication control logic 310 that is adapted to establish one or more OSI-L3 tunnels (e.g., GRE tunnels) with an AP (e.g., AP $210_1$ of FIG. 2) based on the number of VLANs supported by the network. Herein, transceiver 300 receives and transmits messages, including messages that are used to establish OSI-L3 tunnels as described below.

According to one embodiment of the invention, communication control logic 310 comprises a memory 315 to store software 320 (e.g., tunneling module) that is processed by a processor 330 to determine whether an additional OSI-L3 tunnel needs to be established based on information within messages received by wireless transceiver 300.

As an illustrative embodiment, communication control logic 310 may be implemented with rules-based software 320 that, when executed by processor 330, determines whether an additional OSI-L3 tunnel is needed upon detecting certain attributes associated with an incoming message from a STA and the additional OSI-L3 tunnel has not been previously created. Such detection may occur during AP-STA association, during authentication of AP by STA or after such authentication.

For instance, as an example, communication control logic 310 may be adapted with a tunneling rule that establishes separate OSI-L3 (or VLAN) tunnels based on the type of encryption used for communications with the STA. In this example, additional OSI-L3 tunnels may be created if incoming communications from the STA are encrypted with an encryption algorithm (e.g., Advanced Encryption Standard "AES", Temporal Key Integrity Protocol "TKIP", etc.) that differs from a default encryption algorithm (e.g., Wired Equivalent Privacy "WEP") and no previous tunnel directed to this particular encryption type has been created. Moreover, as another illustrative example, communication control logic 310 may be adapted to determine whether additional OSI-L3 tunnels are needed based on the user authentication method deployed within network 100.

In addition or in lieu of establishing additional VLAN tunnels based on attributes of the received communications, communication control logic 310 may be configured to establish additional OSI-L3 tunnels based on attributes of the STA. Examples of STA attributes include, but are not limited or restricted to the user or domain name of the STA, the medium access control (MAC) address of the STA, and the like.

As described above, communication control logic 310 has been described as rule-based software implemented within network switch 200. Of course, it is contemplated that communication control logic 310 may be implemented as hardware and/or firmware separate from or operating in combination with software.

II. VLAN Operation

A. General Exemplary Embodiment

Figure 4A:
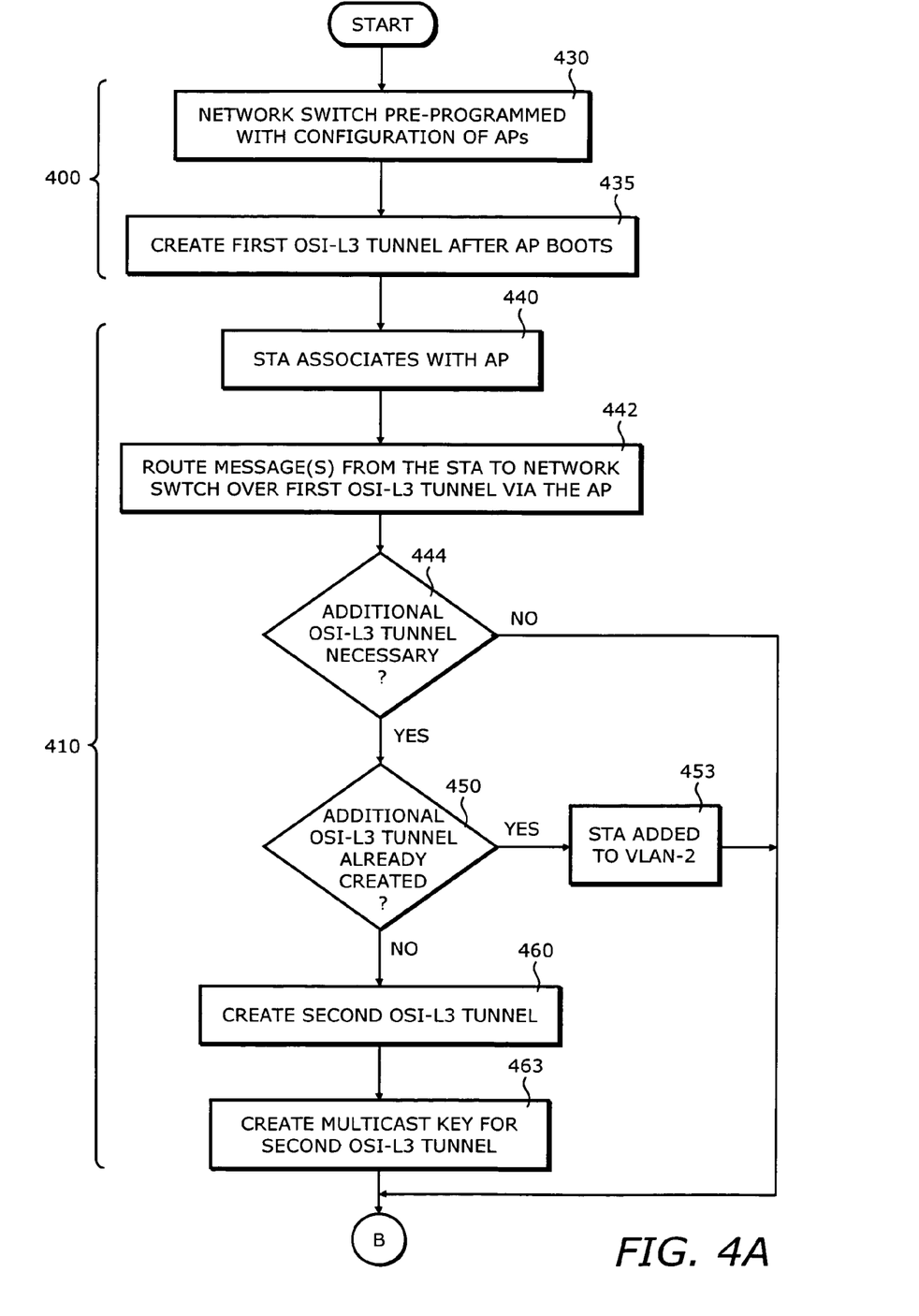
FIGS. 4A and 4B are exemplary embodiments of a virtual local area network (VLAN) tunneling operation that is conducted by the network switch of FIG. 3 is shown.
Figure 4B:
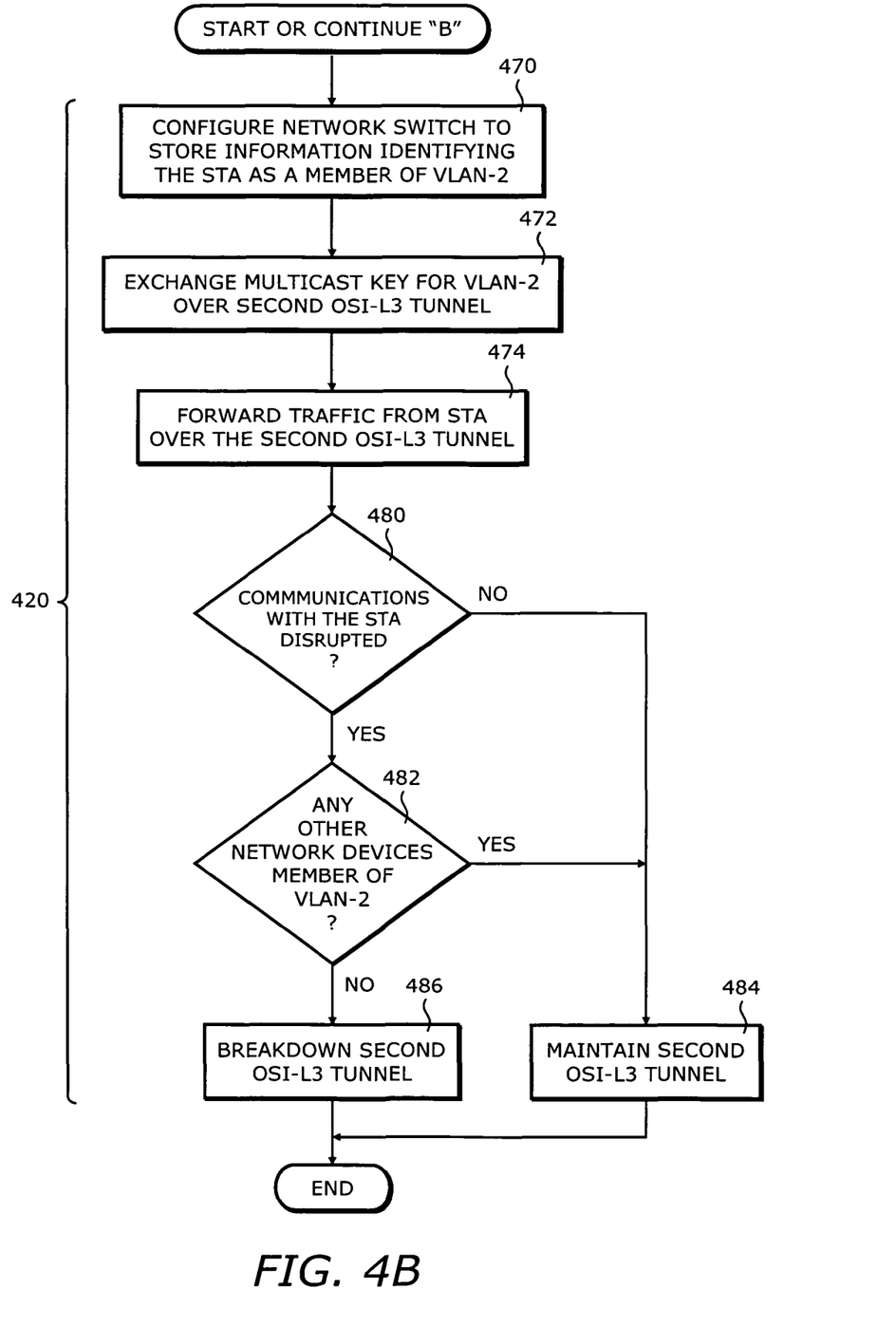

Referring now to FIGS. 4A-4B, an exemplary embodiment of a virtual local area network (VLAN) tunneling operation that is conducted by network switch 300 of FIG. 3 is shown. The VLAN tunneling operations are directed to creating an OSI-L3 tunnel dedicated to a particular VLAN in response to detection of an attribute that signifies creation of a new tunnel, provided the tunnel has not been previously created.

These OSI-L3 tunneling operations may be separated into three operational states: OSI-L3 tunnel initialization 400; OSI-L3 tunnel formation 410; and OSI-L3 tunnel configuration 420. It is contemplated that these operational states may be entered in a successive fashion or one or more of these states may be entered in a parallel fashion so that multiple operations are performed concurrently.

In accordance with the OSI-L3 tunnel initialization state 400, the network switch is pre-programmed with the configurations of Access Points (APs) in communication with the switch. From this pre-programmed information, the network switch can determine what VLAN is assigned to a particular AP (block 430). In other words, when the particular AP bootstraps and locates switch, the AP downloads an image that it needs to run and also downloads the configuration. The configuration will put the AP on the VLAN specified by the switch.

For this illustrative example, we shall consider the AP as part of a first VLAN (VLAN-1). Hence, after the AP boots, the network switch creates a first OSI-L3 tunnel associated with VLAN-1 to the AP (block 435). The first OSI-L3 tunnel operates as a default tunnel for information received by the AP and routed to the network switch.

In the VLAN tunnel formation state 410, a station (STA) associates with the AP (block 440). During and/or after association, messages from the STA are routed over the first OSI-L3 tunnel from the AP to a network switch (block 442). Thereafter, the network switch determines whether an additional OSI-L3 tunnel is necessary for communications with the STA based on certain tunneling rules followed by the network switch (block 444).

As an illustrative embodiment, various potential tunneling rules are described in detail, and it is contemplated that the invention is not limited to the tunneling rules described below. One tunneling rule is to establish OSI-L3 tunnels (each associated with a different VLAN) based on the encryption type supported by the STA. For instance, a STA supporting WEP could be placed on a different VLAN than STAs supporting other types of encryption such as AES or TKIP. Another tunneling rule may be configured to establish OSI-L3 tunnels based on the media access control (MAC) address of the STA. For instance, STAs may be assigned to certain VLANs based on data within their MAC addresses or Basic Service Set Identifier "BSSID" of the AP or Extended Service Set Identifier "ESSID" of the AP. Yet another tunneling rule may be configured to establish OSI-L3 tunnels based on the username of the user of the STA (e.g., name followed by "@" followed by the name of the Internet domain). Yet another tunneling rule may be configured to establish OSI-L3 tunnels based on the location of the AP.

Upon the network switch determining that a second OSI-L3 tunnel that is associated with another VLAN (e.g., VLAN-2) is necessary for communications with the STA, the second OSI-L3 tunnel is created (blocks 450 and 460). However, if the second OSI-L3 tunnel already exists, the STA is merely added to VLAN-2 (block 455).

After the second OSI-L3 tunnel is created, a new multicast encryption key is created for this tunnel (block 465). The newly created multicast encryption key will be shared among all wireless devices that are members of VLAN-2 for encryption and decryption purposes. The multicast encryption key may be created through a static key configuration scheme or a dynamic key configuration scheme.

In the static key configuration scheme, one or more multicast keys are preconfigured on the network switch and the AP. So, a preconfigured key is selected as the multicast key for the second OSI-L3 tunnel. In a dynamic key configuration scheme, however, communication sessions between the AP and the network switch are performed to establish a key recognized by both the AP and the network switch. According to one embodiment of the invention, the communication session is performed in accordance with the IEEE 802.1x standard. Using this key, a multicast key can be generated and securely exchanged between the network switch and the AP.

It is contemplated that the multicast key exchange occurs prior to the STA obtaining an IP address so that authentication should be performed on the OSI L2 layer. When performing the multicast key exchange for the new VLAN-2, all data traffic from the STA, including Dynamic Host Configuration Protocol (DHCP) traffic, is blocked so that STA cannot obtain an IP address until after the multicast key exchange has completed. Only after the multicast keys are established and then exchanged over the second OSI-L3 tunnel will the STA be able to obtain an IP address.

In the OSI-L3 tunnel configuration state 420, the network switch is configured to store information identifying that the STA is a member of VLAN-2 (block 470). In addition, the multicast key for VLAN-2 is exchanged over the second OSI-L3 tunnel (block 472). In the meantime, all data traffic from the STA that is used to obtain an IP address (e.g., Dynamic Host Configuration Protocol "DHCP" traffic) is blocked until the second OSI-L3 tunnel and its corresponding multicast keys have been established. This blocking occurs since the STA does not have any keys (unicast and multicast) and there are no keys loaded into the switch to decrypt any data traffic from the STA. Only after establishing the new tunnel and establishing the keys for the new tunnel in the switch will the keys (unicast and multicast) be exchanged to the STA.

Thereafter, once the second OSI-L3 tunnel is established and the multicast key for VLAN-2 is exchanged, all traffic from the STA will be forwarded over the second OSI-L3 tunnel and all traffic from the network switch are directed to the STA will be forwarded over the second OSI-L3 tunnel (block 474).

In the event that the STA disassociates from the AP or communications with the STA are disrupted, the AP determines whether there are any other STAs on VLAN-2 (blocks 480 and 482). If so, the second OSI-L3 tunnel is maintained (block 484). Otherwise, the second OSI-L3 tunnel is broken down so that the OSI-L3 tunnel is removed (block 486).

B. Illustrative Exemplary Embodiments

Figure 5A:
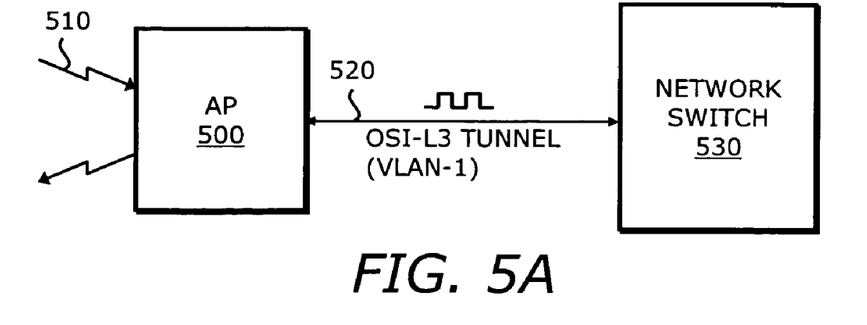
FIGS. 5A-5C are exemplary embodiments of outlining the establishment of a secondary communication path (OSI-L3 tunnel) between the AP and wireless network switch to support an exchange of information associated with a specific VLAN.
Figure 5B:
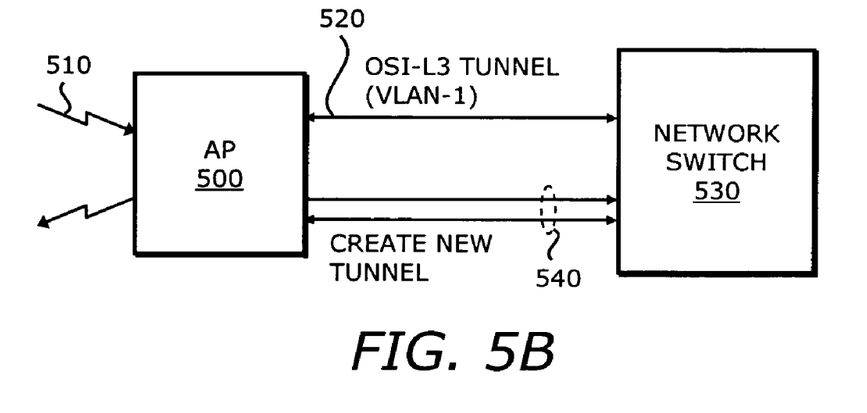
Figure 5C:
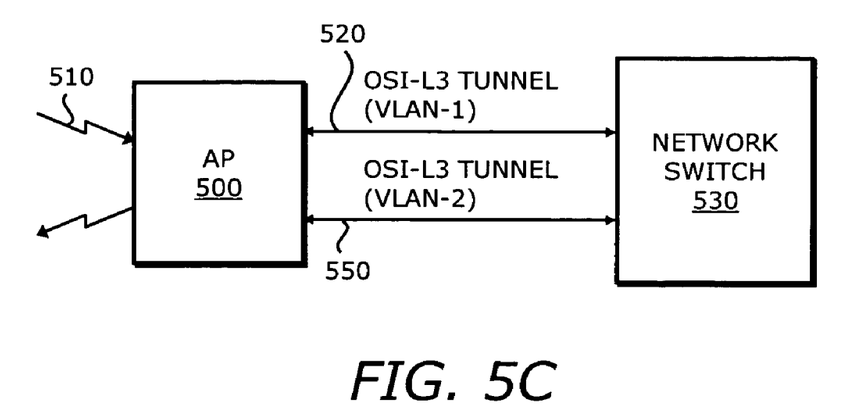

Referring now to FIGS. 5A-5C, exemplary embodiments of the operations performed in the formulation and configuration of an OSI-L3 tunnel is shown. As shown in FIG. 5A, AP 500 receives a message 510. Message 510 is routed over an OSI-L3 tunnel 520 associated with a first VLAN (VLAN-1), which is established between AP 500 to a network switch 530 when AP 500 powers-up. OSI-L3 tunnel 520 operates as a default tunnel for messages received from any wireless device that has not been assigned to a particular VLAN associated with the network.

Thereafter, network switch 530 determines whether an additional OSI-L3 tunnel is necessary for communications with the STA based on certain tunneling rules followed by the network switch. In other words, a determination may be made whether the STA belongs to a different VLAN (e.g., VLAN-2) instead of VLAN-1. If an additional OSI-L3 tunnel is necessary, all messages from the STA, including DHCP-based messages, are blocked so that the STA cannot obtain an IP address until after a multicast key exchange has completed.

Thereafter, as shown in FIGS. 5B and 5C, the additional OSI-L3 tunnel 550 is formed unless this additional tunnel already exists. The additional OSI-L3 tunnel 550 is formed with a multicast encryption key assigned to tunnel 550. The multicast encryption key is created by conducting a multicast key exchange 540 as described above. The newly created multicast encryption key will be shared among all STAs being part of VLAN-2 so that all STAs that are members of VLAN-2 can decrypt messages directed to wireless devices forming VLAN-2.

Figure 6A:
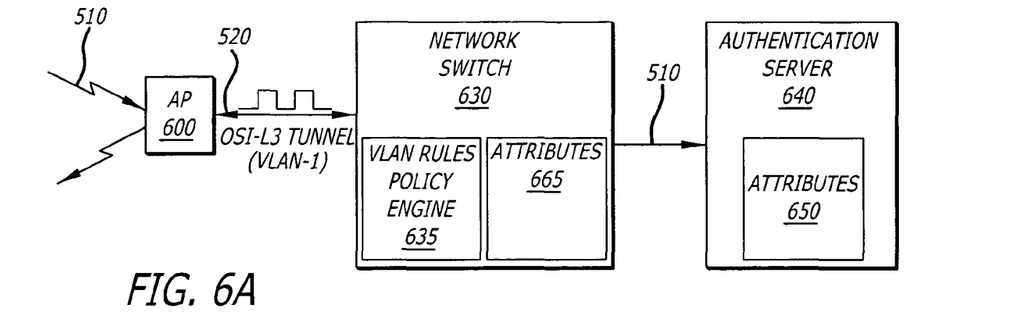
FIGS. 6A-6C are exemplary embodiments of outlining the operations of an authentication server and a wireless network in order to establish a secondary communication path OSI-L3 tunnel) between the AP and wireless network switch that is used for the exchange of information associated with a specific VLAN.
Figure 6B:
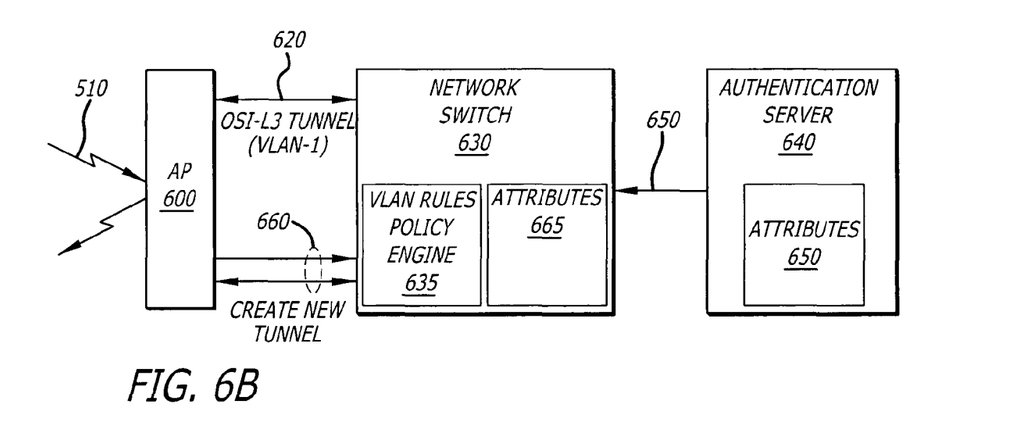
Figure 6C:
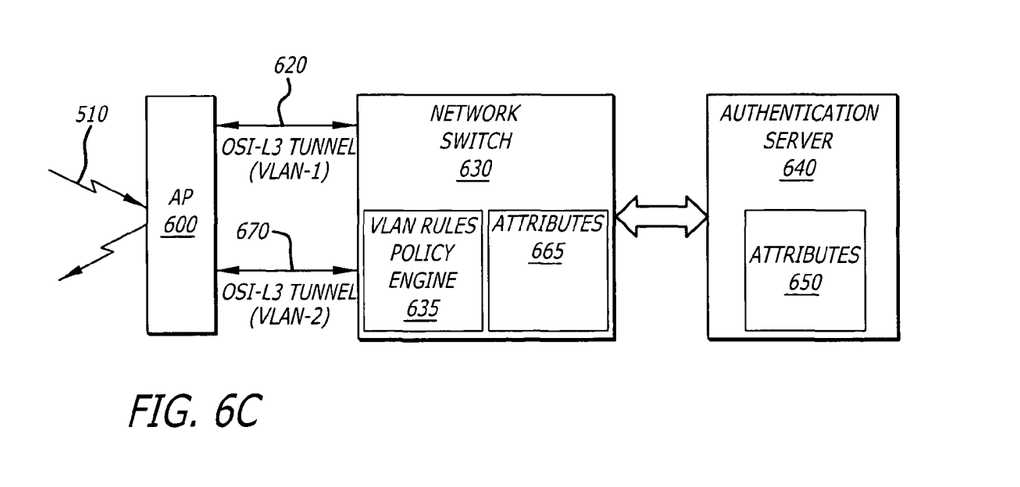

Referring to FIGS. 6A-6C, exemplary embodiments of the operations performed in the formulation and configuration of an OSI-L3 tunnel is shown. As shown in FIG. 6A, AP 600 receives message 510. Message 510 is routed over an OSI-L3 tunnel 620 associated with a first VLAN (VLAN-1), which is previously established between AP 600 to a network switch 630. Thereafter, network switch 630 routes message 510 to an authentication server 640.

As shown in FIG. 6B, authentication server 640 receives message 510 and returns attributes 650 associated with message 510 and/or sender. These attributes 650 may include, but are not limited or restricted to a VLAN identifier, vendor specific attributes, Microsoft® Active Directory User Attributes, or the like. Based on attributes 650 and/or attributes 655 stored herein, a VLAN rules policy engine 635 of network switch 630 determines whether an additional OSI-L3 tunnel is necessary for communications with the STA based on certain tunneling rules associated with attributes 650.

In other words, depending on VLAN rules policy engine 635, creation of a new OSI-L3 tunnel depends on which STA is associating, the rules configured on network switch 630 and attributes 650 sent by authentication server 640 or attributes 665 configured on switch 630 itself, especially if the STA does not authenticate. If an additional OSI-L3 tunnel is necessary, all messages from the STA, including DHCP-based messages, are blocked so that the STA cannot obtain an IP address until after a multicast key exchange has completed.

Thereafter, as shown in FIGS. 6B and 6C, the additional OSI-L3 tunnel 670 is formed unless this additional tunnel already exists. The additional OSI-L3 tunnel 670 is formed with a multicast encryption key assigned to tunnel 670. The multicast encryption key is created by conducting a multicast key exchange 660 as described above. The newly created multicast encryption key will be shared among all STAs being part of VLAN-2 so that all STAs that are members of VLAN-2 can decrypt messages directed to wireless devices forming VLAN-2.

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. A method comprising:
   receiving information over a first tunnel associated with a first virtual local area network;
   creating a second tunnel associated with a second and different virtual local area network if the information is determined to be from a network device that is a member of the second virtual local area network based on a first type of encryption supported by the first tunnel being different from a second type of encryption that is used to encrypt the received information,
   wherein creating of the second tunnel includes:
   performing a multicast key exchange to establish a multicast key for the second tunnel, wherein the multicast key is different from the key used to encrypt traffic in the first tunnel, and
   blocking messages from the network device until the multicast key exchange has completed.

2. The method of claim 1, wherein the network device is a wireless station.

3. The method of claim 1, wherein the type of encryption supported by the first tunnel is Wired Equivalent Privacy (WEP) and the type of encryption supported by the second tunnel is a non-WEP encryption algorithm.

4. The method of claim 1, wherein the creating of the second tunnel includes creating an Open Systems Interconnection Layer 3 (OSI-L3) tunnel that transfers encapsulated Layer 2 and Layer 3 traffic.

5. A non-transitory computer-readable storage medium having instructions stored thereon, when executed by a processor implemented within a network switch of a network, causes the network switch to perform a method comprising:
   receiving the information over a first tunnel associated with a first virtual local area network; and
   creating the second tunnel associated with a second and different virtual local area network if the information is determined to be from a network device that is a member of the second virtual local area network based on a first type of encryption supported by the first tunnel being different from a second type of encryption that is used to encrypt the received information, wherein creating of the second tunnel includes:
   performing a multicast key exchange to establish a multicast key for the second tunnel, wherein the multicast key is different from the key used to encrypt traffic in the first tunnel, and
   blocking messages from the network device until the multicast key exchange has completed.

6. The computer-readable storage medium of claim 5 further comprising-routing all data received from the network device over the second tunnel after establishment of the second tunnel.

7. The computer-readable storage medium of claim 5, wherein a the unique multicast key for the second tunnel flint-is made available to a t-he-network switch and the network device.

8. The non-transitory computer-readable storage medium of claim 5,
   wherein the type of encryption supported by the first tunnel is Wired Equivalent Privacy (WEP) and the type of encryption supported by the second tunnel is a non-WEP encryption algorithm.

9. The non-transitory computer-readable storage medium of claim 5, wherein the creating of the second tunnel includes creating an Open Systems Interconnection Layer 3 (OSI-L3) tunnel that encapsulates both Layer 2 and Layer 3 traffic.

10. A method comprising:
creating a second tunnel associated with a second virtual local area network if received information is determined to be from a network device that is a member of the second virtual local area network based on a first type of encryption supported by a first tunnel being different from a second type of encryption that is used to encrypt the received information, the first virtual local area network corresponding to a tunnel previously established, wherein creating of the second tunnel includes:
performing a multicast key exchange to establish a multicast key for the second tunnel, wherein the multicast key is different from the key used to encrypt traffic in the first tunnel, and
blocking messages from the network device until the multicast key exchange has completed.

11. The method of claim 10, wherein the network device is a wireless station.

* * * * *